US008406189B2

(12) United States Patent
Hoshino et al.

(10) Patent No.: US 8,406,189 B2
(45) Date of Patent: *Mar. 26, 2013

(54) TRANSMITTING APPARATUS AND COMMUNICATION METHOD IN A COMMUNICATION SYSTEM WHEREIN A PLURALITY OF SYSTEM BANDWIDTHS ARE SET

(75) Inventors: Masayuki Hoshino, Kanagawa (JP); Alexander Golitschek Edler Von Elbwart, Darmstadt (DE); Hidetoshi Suzuki, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,314

(22) Filed: May 12, 2011

(65) Prior Publication Data
US 2011/0211482 A1 Sep. 1, 2011

Related U.S. Application Data

(63) Continuation of application No. 12/680,182, filed as application No. PCT/JP2008/002737 on Sep. 30, 2008, now Pat. No. 7,970,001.

(30) Foreign Application Priority Data

Oct. 1, 2007 (JP) ................................. 2007-257779

(51) Int. Cl.
*H04W 4/00* (2009.01)
(52) U.S. Cl. .......... 370/329; 370/252; 370/328; 455/69; 455/522
(58) Field of Classification Search ........................ None
See application file for complete search history.

(56) References Cited

U.S. PATENT DOCUMENTS

2006/0256761 A1 11/2006 Meylan et al.
2009/0073929 A1* 3/2009 Malladi et al. ................ 370/329

FOREIGN PATENT DOCUMENTS

| EP | 1 662 689 | | 5/2006 |
|---|---|---|---|
| EP | 1 750 407 | | 2/2007 |
| EP | 1750408 | A2 * | 2/2007 |
| EP | 1 821 470 | | 8/2007 |
| JP | 2007-129377 | | 5/2007 |
| WO | 2007/015627 | | 2/2007 |
| WO | 2007/053403 | | 5/2007 |

OTHER PUBLICATIONS

International Search Report dated Nov. 25, 2008.
3GPP TSG RAN WG1#48bis, "CQI Design and Its Impact to DL Performance," Nokia and Siemens, R1-071682, Mar. 2007, pp. 1-7.

(Continued)

*Primary Examiner* — Ian N Moore
*Assistant Examiner* — Jackie Zuniga
(74) *Attorney, Agent, or Firm* — Dickinson Wright PLLC

(57) ABSTRACT

A receiver apparatus wherein the processing amount for CQI (Channel Quality Indicator) measurements in a communication system having a plurality of system bandwidths can be reduced. In this apparatus, a narrow band CQI measurement part (109) measures, as a narrow band CQI, the CQI in resource blocks the number of which is required for the CQI measurement from the start position of a narrow bandwidth transmitted from a transmitter apparatus; a wide band CQI measurement part (110) extracts, from a system bandwidth transmitted from the transmitter apparatus, resource blocks the number of which is required for the CQI measurement, and then measures, as a wide band CQI representative of the channel quality of the whole system bandwidth, an average CQI in the extracted resource blocks; and a feedback information generating part (111) generates feedback information including both the narrow band CQI and the wide band CQI.

12 Claims, 11 Drawing Sheets

OTHER PUBLICATIONS

3GPP TSG RAN WG1 Meeting #50, "CQI Reporting Requirements for E-UTRA UE," Nokia Siemens Networks and Nokia, R1-073681, Aug. 2007, pp. 1-4.

3GPP RAN WG1 Meeting #42, "MIMO for Long Term Evolution," Samsung, R1-050889, Aug. 29-Sep. 2, 2005, pp. 1-19.

Japanese Office Action dated Jul. 6, 2010.

Extended European Search Report dated Oct. 19, 2010.

3GPP TSG RAN1#43, "CQI Feedback Scheme for EUTRA," Motorola, R1-051334, Nov. 2005, pp. 1-9.

* cited by examiner

| CQI | TBS |
|-----|------|
| 1 | 150 |
| 2 | 240 |
| ... | ... |
| 4 | 3000 |

TRANSMITTING APPARATUS AND COMMUNICATION METHOD IN A COMMUNICATION SYSTEM WHEREIN A PLURALITY OF SYSTEM BANDWIDTHS ARE SET

This is a continuation application of application Ser. No. 12/680,182 filed Mar. 25, 2010, which is a national stage of PCT/JP2008/002737 filed Sep. 30, 2008, which is based on Japanese Application No. 2007-257779 filed Oct. 1, 2007, the entire contents of each which are incorporated by reference herein. Other continuation applications of Ser. No. 12/680,182 filed Mar. 25, 2010 are: application Ser. No. 12/984,555 filed Jan. 4, 2011 and application Ser. No. 12/984,559 filed Jan. 4, 2011.

TECHNICAL FIELD

The present invention relates to a receiving apparatus and a communication method used in a radio communication system.

BACKGROUND ART

In recent years, in OFDM (Orthogonal Frequency Division Multiplexing) scheme, studies are conducted for a technique of employing adaptive modulation and frequency scheduling in each RB (Resource Block) grouping a plurality of subcarriers, and improving spectrum efficiency. Adaptive modulation refers to a scheme for deciding coding rates and modulation schemes according to channel conditions observed on the receiving side so that a predetermined packet error rate is satisfied. With frequency scheduling, a plurality of mobile stations report channel conditions observed per RB on the receiving side, and the base station collects the channel conditions and allocates RBs to mobile stations according to a predetermined scheduling algorithm. Values used in these adaptive modulation and frequency scheduling for reporting channel conditions are called channel quality information (CQI: Channel Quality Indicator).

As for CQI, parameters showing channel quality of contiguous RBs corresponding to the minimum unit of frequency scheduling are a "narrowband CQI," that is, a subband CQI, and parameters showing channel quality of overall system bandwidth are a "wideband CQI," that is, a system bandwidth CQI (see Non-Patent Document 1). A narrowband CQI is read as channel quality acquired in receiving processing in a mobile station when a base station allocates predetermined subbands, and is used for adaptive modulation of the subbands. Meanwhile, a wideband CQI is read as averaged channel quality acquired in receiving processing in a mobile station when a base station allocates arbitrary subbands, and used for adaptive modulation of arbitrary subbands. FIG. 1 illustrates a narrowband CQI and a wideband CQI. As shown in FIG. 1, the overall system bandwidth is formed with a plurality of RBs. Further, in FIG. 1, a mobile station measures a narrowband (subband) CQI by estimating for example SINR (Signal to Interference plus Noise Ratio), channel quality of two contiguous RBs, and measures a wideband CQI by estimating the channel quality of the overall system bandwidth.

Non-Patent Document 1: 3GPP R1-073681, Nokia Siemens Networks, Nokia, "CQI reporting requirements for E-UTRA UE," 20th-24th Aug. 2007

DISCLOSURE OF INVENTION

Problems to be Solved by the Invention

However, in a communication system providing a plurality of bandwidths as system bandwidths like LTE (Long-Term Evolution), a mobile station needs to estimate channel quality of overall system bandwidth by corresponding to a plurality of system bandwidths, to measure a plurality of wideband CQIs. Further, to estimate channel quality, a mobile station requires decoding capacity to support all multiple transmission speeds of when a plurality of system bandwidths are each used. For example, the mobile station requires 30 Mbps decoding capacity to support the transmission speed upon using a 10 MHz system bandwidth. Consequently, the amount of processing required for the mobile station increases.

FIG. 2 explains these problems. FIG. 2 shows a case as an example where a communication system provides three system bandwidths, 10 MHz, 5 MHz and 3 MHz. Here, a CQI is represented by, for example, a TBS (Transport Block Size). TBS represents the number of information bits that can be transmitted while satisfying a predetermined packet error rate in the entire system bandwidth when communication is carried out with a channel SINR measured in the mobile station. The mobile station needs to hold CQI tables, in which TBSs are associated with CQI indices, corresponding to a plurality of system bandwidths (10 MHz, 5 MHz and 3 MHz), respectively. The mobile station finds a TBS value by channel estimation, generates a CQI index with reference to a CQI table associated with a system bandwidth, and feeds back the CQI index to the base station. For example, when the system band is 10 MHz (50 RBs), the mobile station performs channel estimation for a system bandwidth of 10 MHz, to acquire a TBS of 12000 bits as channel quality, and reports a CQI index associated with the TBS of 12000 bits to the base station. Further, when the system band is 5 MHz (25 RBs), the mobile station performs channel estimation for a system bandwidth of 5 MHz, to acquire a TBS of 6000 bits as channel quality, and reports a CQI index associated with the TBS of 6000 bits to the base station.

It is therefore an object of the present invention to provide a receiving apparatus and a communication method that are able to reduce the amount of processing for measuring and reporting CQIs in a communication system providing a plurality of system bandwidths.

Means for Solving the Problem

The receiving apparatus of the present invention adopts the configuration including: a first CQI measurement section that measures a CQI for resource blocks to equal the number of resource blocks for CQI measurement from a stating position of a subband transmitted from a transmitting apparatus, as a first CQI; a second CQI measurement section that extracts the resource blocks to equal the number of resource blocks for the CQI measurement from a system bandwidth transmitted from the transmitting apparatus, and measures an average CQI for the extracted resource blocks as a second CQI for the overall system bandwidth; and feedback section that feeds back the first CQI and the second CQI to the transmitting apparatus.

The reception method of the present invention includes the steps of: measuring a CQI for resource blocks to equal the number of resource blocks for CQI measurement from a stating position of a subband transmitted from a transmitting apparatus, as a first CQI; extracting the resource blocks to equal the number of resource blocks for the CQI measurement from a system bandwidth transmitted from the transmitting apparatus, and measuring an average CQI for the extracted resource blocks as a second CQI for the overall system bandwidth; and feeding back the first CQI and the second CQI to the transmitting apparatus.

Advantageous Effects of Invention

According to the present invention, it is possible to reduce the amount of processing in a receiving apparatus for measuring and reporting CQIs in a communication system providing a plurality of system bandwidths.

BRIEF DESCRIPTION OF DRAWINGS

FIG. 5 shows an example of a CQI table according to Embodiment 1 of the present invention;

BEST MODE FOR CARRYING OUT THE INVENTION

Figure 1:
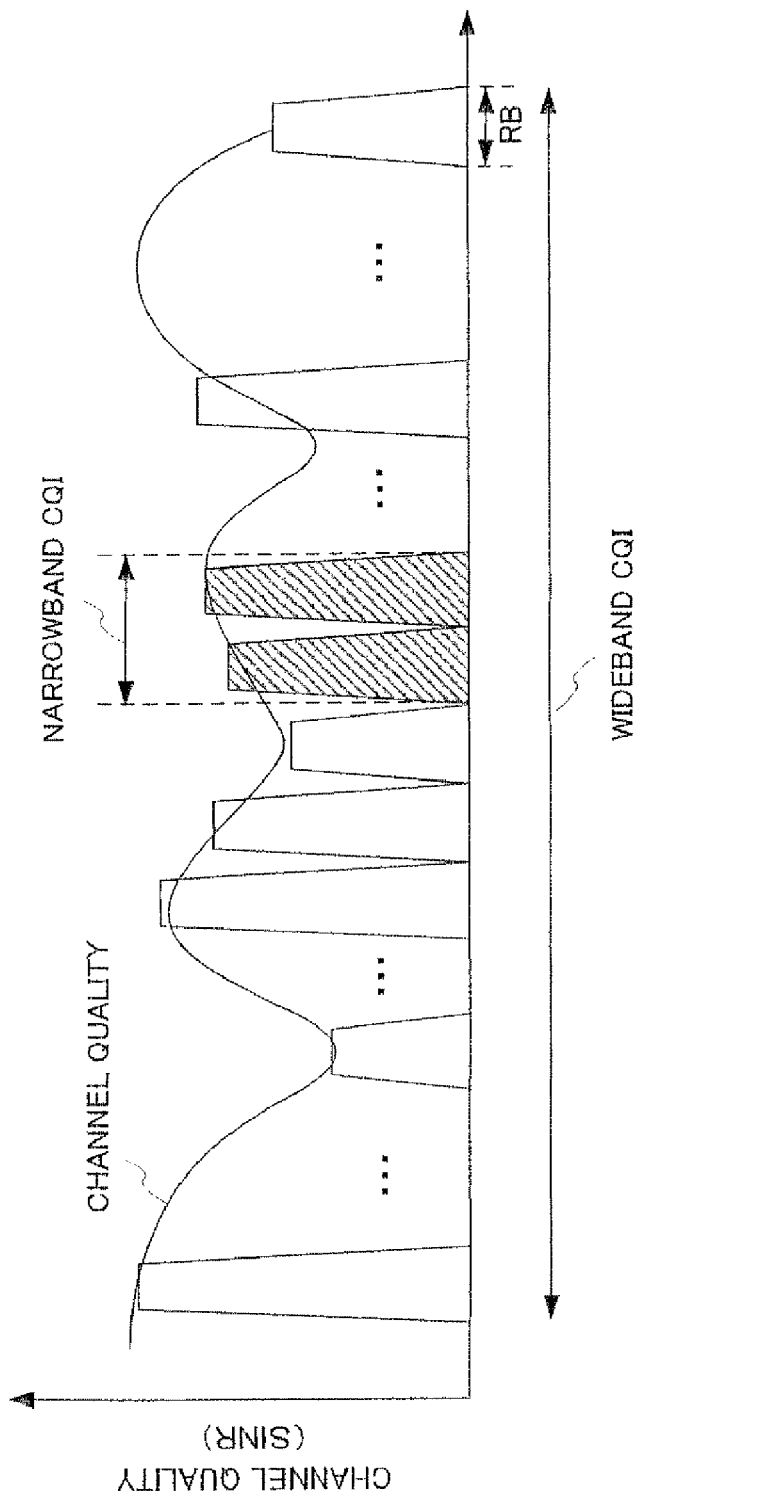
FIG. 1 explains a narrowband CQI and a wideband CQI with related art.
Figure 2:
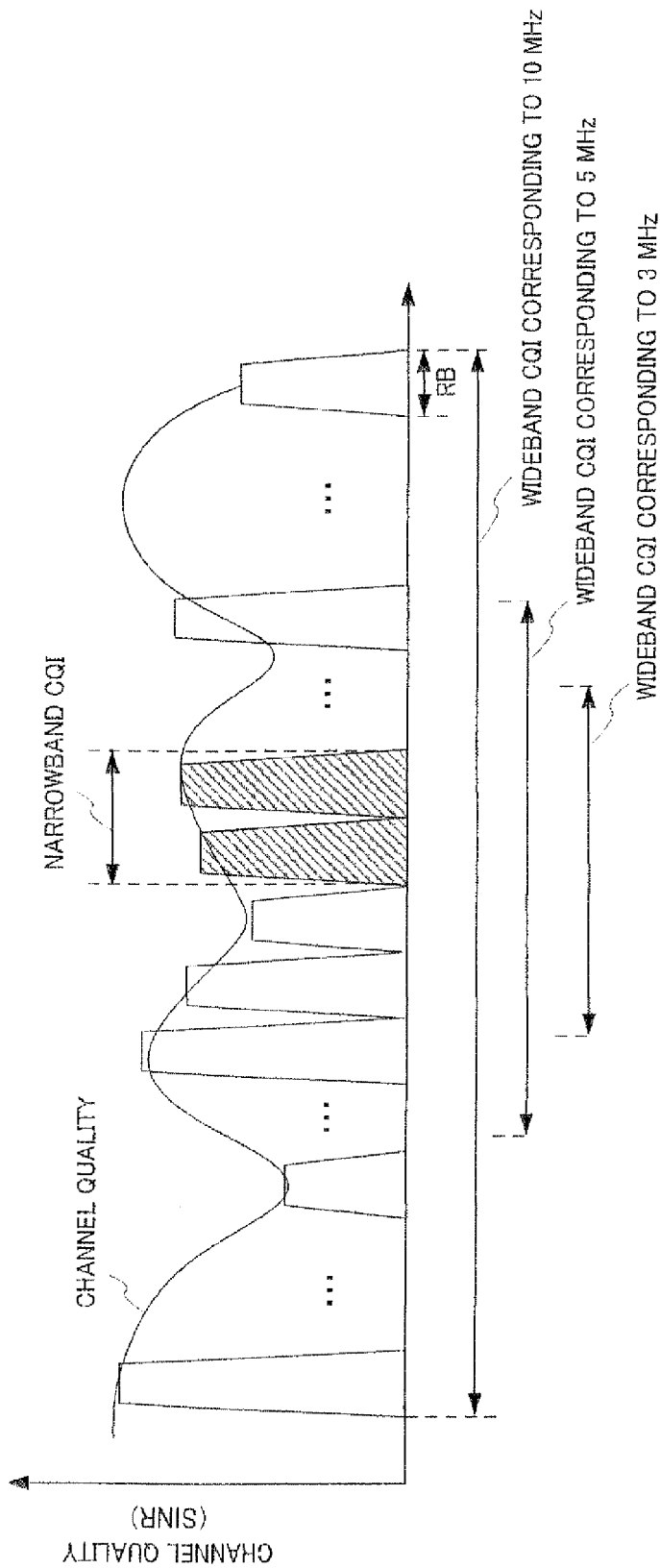
FIG. 2 explains problems with related art.

Now, embodiments of the present invention will be described in detail with reference to the accompanying drawings. Further, in embodiments, the components having the same functions will be assigned to the same reference numerals and overlapping descriptions will be omitted.

(Embodiment 1)

Figure 3:
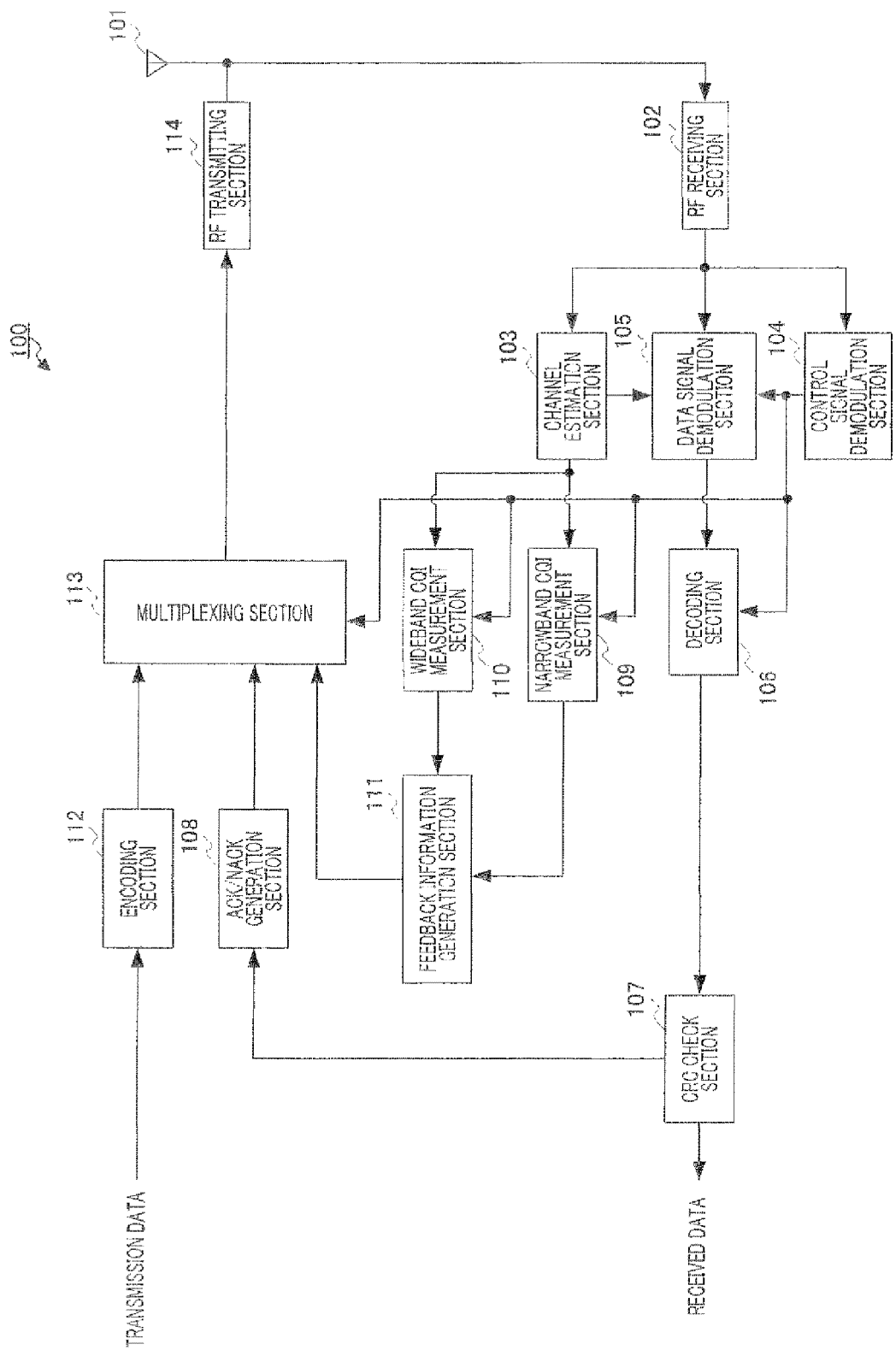
FIG. 3 is a block diagram showing a configuration of the receiving apparatus according to Embodiment 1 of the present invention.

FIG. 3 is a block diagram showing the configuration of receiving apparatus 100 according to Embodiment 1 of the present invention. A mobile station apparatus is a concrete example of receiving apparatus 100 shown in FIG. 3, and receiving apparatus 100 supports a plurality of system bandwidths.

In FIG. 3, RF receiving section 102 receives a signal transmitted from transmitting apparatus 150 (described later) via antenna 101, performs radio receiving processing including down-conversion and A/D conversion on the received signal, and, in the signal after radio receiving processing, outputs a pilot signal to channel estimation section 103, outputs a control signal to control signal demodulation section 104 and outputs a data signal to data signal demodulation section 105.

Channel estimation section 103 calculates a channel estimation value (channel matrix) using the pilot signal outputted from RF receiving section 102, and outputs the calculated channel estimation value to data signal demodulation section 105, narrowband CQI measurement section 109 and wideband CQI measurement section 110.

Control signal demodulation section 104 demodulates the control signal outputted from RF receiving section 102, outputs the system bandwidth included in the demodulated control signal to wideband CQI measurement section 110, outputs the narrow bandwidth start position to narrowband CQI measurement section 109, outputs the modulation scheme and coding rate to data signal demodulation section 105 and decoding section 106, respectively, and outputs resource allocation result to multiplexing section 113. Here, if the system bandwidth is 10 MHz, the system bandwidth is shown in the number of RBs corresponding to 10 MHz, and the narrow bandwidth start position is shown in an RB number.

Data signal demodulation section 105 demodulates the received signal outputted from RF receiving section 102 using the channel estimation value outputted from channel estimation section 103 and the modulation scheme outputted from control signal demodulation section 104, and outputs the demodulation result to decoding section 106.

Decoding section 106 decodes the demodulation result outputted from data signal demodulation section 105 using the coding rate outputted from control signal demodulation section 104, and outputs the decoded data signal (decoded data) to CRC check section 107.

CRC check section 107 performs a CRC check on the decoded data outputted from decoding section 106, to detect whether there is an error or not. CRC check section 107 outputs an error detection result of the decoded data to ACK/NACK generation section 108, and outputs decoded data without an error, as received data.

ACK/NACK generation section 108 generates an ACK or NACK according to the error detection result of the decoded data outputted from CRC check section 107. That is, ACK/NACK generation section 108 generates an ACK if there is not an error, and generates a NACK if there is an error, and outputs the generated ACK/NACK to multiplexing section 113.

Based on the channel matrix outputted from channel estimation section 103, narrowband CQI measurement section 109 measures the TBS in a the predetermined number of RBs for CQI measurement, that is, measures the narrow bandwidth TBS from the narrow bandwidth start position outputted from control signal demodulation section 104. Further, narrowband CQI measurement section 109, which holds a CQI table in which TBSs are associated with CQI indices, finds a CQI index associated with the measured narrow-bandwidth TBS, that is, finds a narrowband. CQI index in the CQI table, and outputs the narrowband CQI index to feedback information generation section 111. The CQI measurement processing in narrowband CQI measurement section 109 will be described later in detail.

Wideband CQI measurement section 110 extracts a predetermined number of RBs for CQI measurement from the system bandwidth outputted from control signal demodulation section 104, and measures the TBS for the extracted RBs based on the channel matrix outputted from channel estimation section 103. Further, wideband CQI measurement section 110, which holds the same CQI table as the CQI table held in narrowband CQI measurement section 109, finds a CQI index associated with the measured TBS in the measured system bandwidth, that is, finds a wideband CQI index in the CQI table, and outputs the wideband CQI index to feedback information generation section 111. The CQI measurement processing in wideband CQI measurement section 110 will be described later in detail.

Feedback information generation section 111 generates feedback information including the narrowband CQI index outputted from narrowband CQI measurement section 109 and the wideband CQI index outputted from wideband CQI measurement section 110, and outputs the generated feedback information to multiplexing section 113. ACK/NACK generation section 108 and feedback information generation section 111 function as a control channel generation section.

Encoding section 112 encodes transmission data and outputs the encoded transmission data to multiplexing section 113.

Multiplexing section 113 forms a control channel with the ACK or NACK outputted from ACK/NACK generation section 108 and the feedback information outputted from feedback information generation section 111. Further, multiplexing section 113 multiplexes the formed control channel and the transmission data outputted from encoding section 112 based on the resource allocation result outputted from control signal demodulation section 104, and outputs the multiplexed signal to RF transmitting section 114.

RF transmitting section 114 performs radio transmitting processing including D/A conversion and up-conversion on the signal outputted from multiplexing section 113, and outputs the signal after radio transmitting processing to transmitting apparatus 150 from antenna 101.

Now, the CQI measurement processing in narrowband CQI measurement section 109 and wideband. CQI measurement section 110 will be described in detail.

Figure 4:
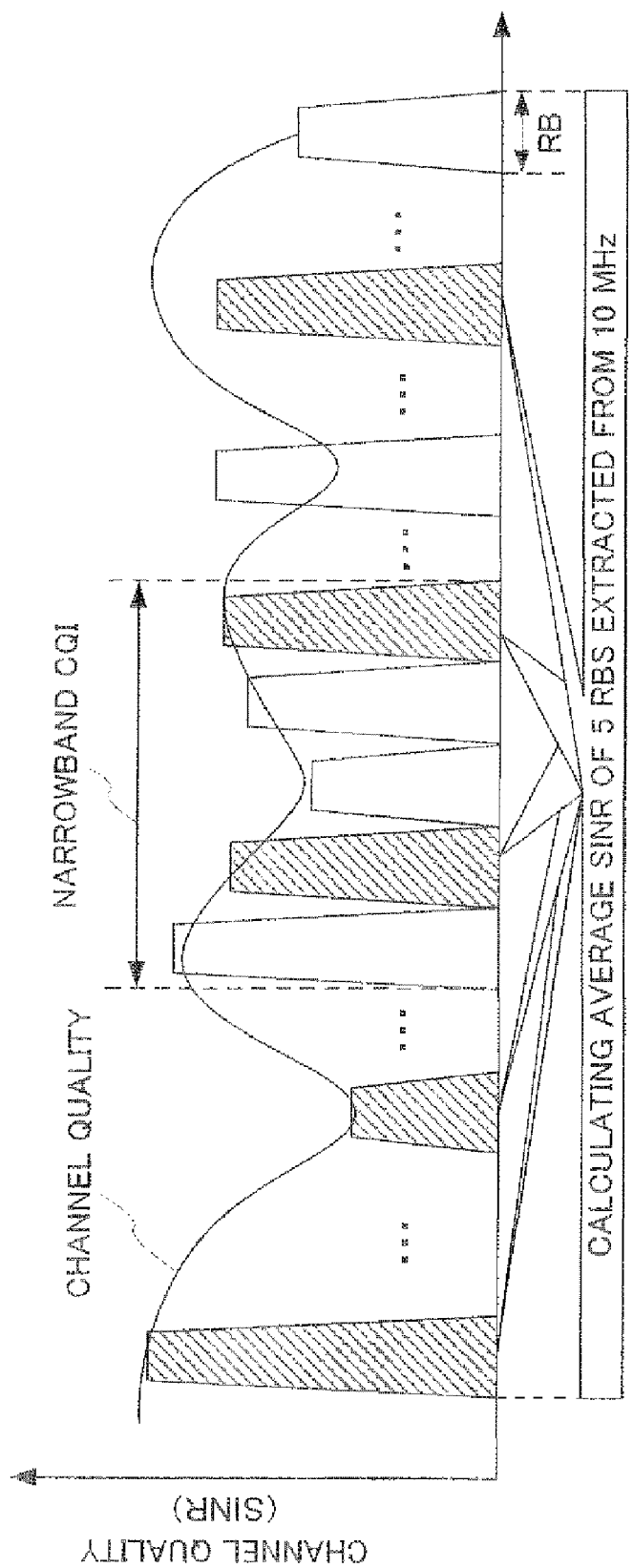
FIG. 4 explains detail of the CQI measurement processing in the narrowband CQI measurement section and the wideband CQI measurement section according to Embodiment 1 of the present invention.

FIG. 4 explains the detail of the CQI measurement processing in narrowband CQI measurement section 109 and wideband CQI measurement section 110. In FIG. 4, the case will be explained as an example where the narrow bandwidth start position outputted from control signal demodulation section 104 to narrowband CQI measurement section 109 is the thirtieth RB and where the system bandwidth outputted from control signal demodulation section 104 to wideband CQI measurement section 110 is 10 MHz. In FIG. 4, the RBs shown in the diagonal lines are the RBs to equal the number of RBs for CQI measurement extracted from the system band of 10 MHz.

As shown in FIG. 4, the number of RBs in which a TBS is measured in narrowband CQI measurement section 109 and the number of RBs in which a TBS is measured in wideband CQI measurement section 110 are both the number of RBs for CQI measurement, for example, "5."

Figure 5:
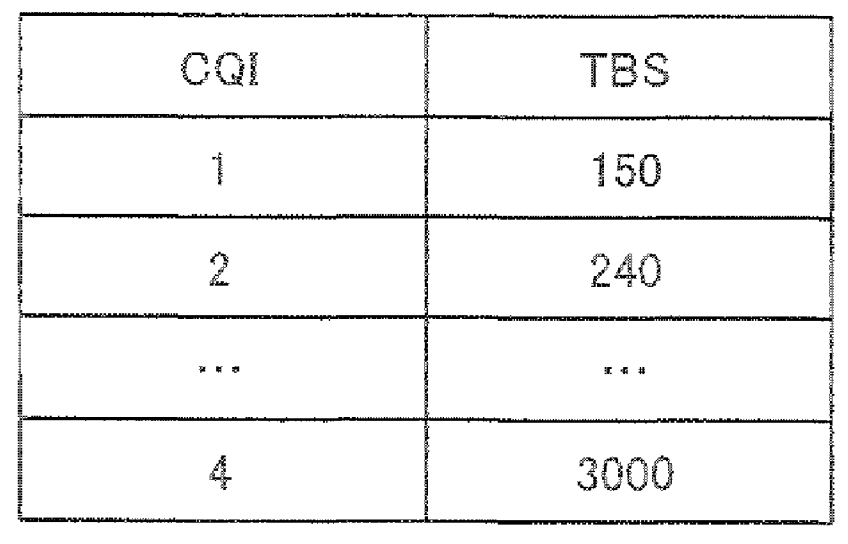

Wideband CQI measurement section 110 extracts RBs to equal the number of RBs for CQI measurement from the system bandwidth outputted from control signal demodulation section 104. For example, when the system bandwidth outputted from control signal demodulation section 104 is 10 MHz, which has 50 RBs, wideband CQI measurement section 110 extracts the first, eleventh, twenty-first, thirty-first, and forty-first RBs from the fifty RBs. Next, wideband CQI measurement section 110 finds SINRs per extracted. RB using the channel estimation value of each subcarrier outputted from channel estimation section 103. Next, wideband CQI measurement section 110 finds an average of the SINRs of the first, eleventh, twenty-first, thirty-first, and forty-first RBs and, based on this average value, calculates a possible TBS upon using resources equaling five RBs. Next, wideband CQI measurement section 110 refers to a provided CQI table as shown in FIG. 5, finds a wideband CQI index associated with the calculated TBS, and outputs the wideband CQI index to feedback information generation section 111. For example, when the calculated TBS is 240 bits, wideband CQI measurement section 110 outputs "2" as the wideband CQI index to feedback information generation section 111.

Meanwhile, narrowband CQI measurement section 109 finds a TBS in RBs to equal the number of RBs for CQI measurement from the narrow bandwidth start position outputted from control signal demodulation section 104. For example, narrowband CQI measurement section 109 finds a TBS in the five RBs, the thirtieth to thirty-fourth RBs shown in FIG. 4. Then, narrowband CQI measurement section 109 finds a narrowband CQI index associated with the calculated TBS with reference to the provided CQI table as shown in FIG. 5, and outputs the narrowband CQI index to feedback information generation section 111.

Now, in wideband CQI measurement section 110, the reason that channel quality in the overall system bandwidth can be shown using the TBS for the number of extracted RBs for CQI measurement, will be explained below. Using turbo codes, when the system bandwidth exceeds a predetermined value, for example, 5 RBs, information bits that can be transmitted while satisfying a predetermined packet error rate, that is, TBS, does not depend on the SINR. Further, from the perspective of frequency diversity, when the bandwidth exceeds about 1 MHz (5 RBs), information bits that can be transmitted while satisfying a predetermined packet error rate, that is, TBS, do not depend on the SINR.

Consequently, the number of RBs equal to or more than the lower limit of the system bandwidth in which TBS does not depend on the SINR is determined to be the number of RBs for CQI measurement in advance, by extracting RBs to equal the number of RBs for CQI measurement and by measuring a TBS, wideband CQI measurement section 110 is able to acquire a wideband CQI index showing channel quality of overall system bandwidth. Although, in FIG. 4, a case is explained as an example where the system bandwidth outputted from control signal demodulation section 104 is 10 MHz, if the system bandwidth outputted from control signal demodulation section 104 is not 10 MHz, and is equal to or more than a bandwidth to equal the number of RBs for CQI measurement, for example, 5 MHz or 3 MHz, wideband CQI measurement section 110 performs similar processing and is able to acquire a wideband CQI index. That is, regardless of the system bandwidth, wideband CQI measurement section 110 extracts RBs for CQI measurement and finds a wideband CQI index using the CQI table shown in FIG. 5.

Figure 6:
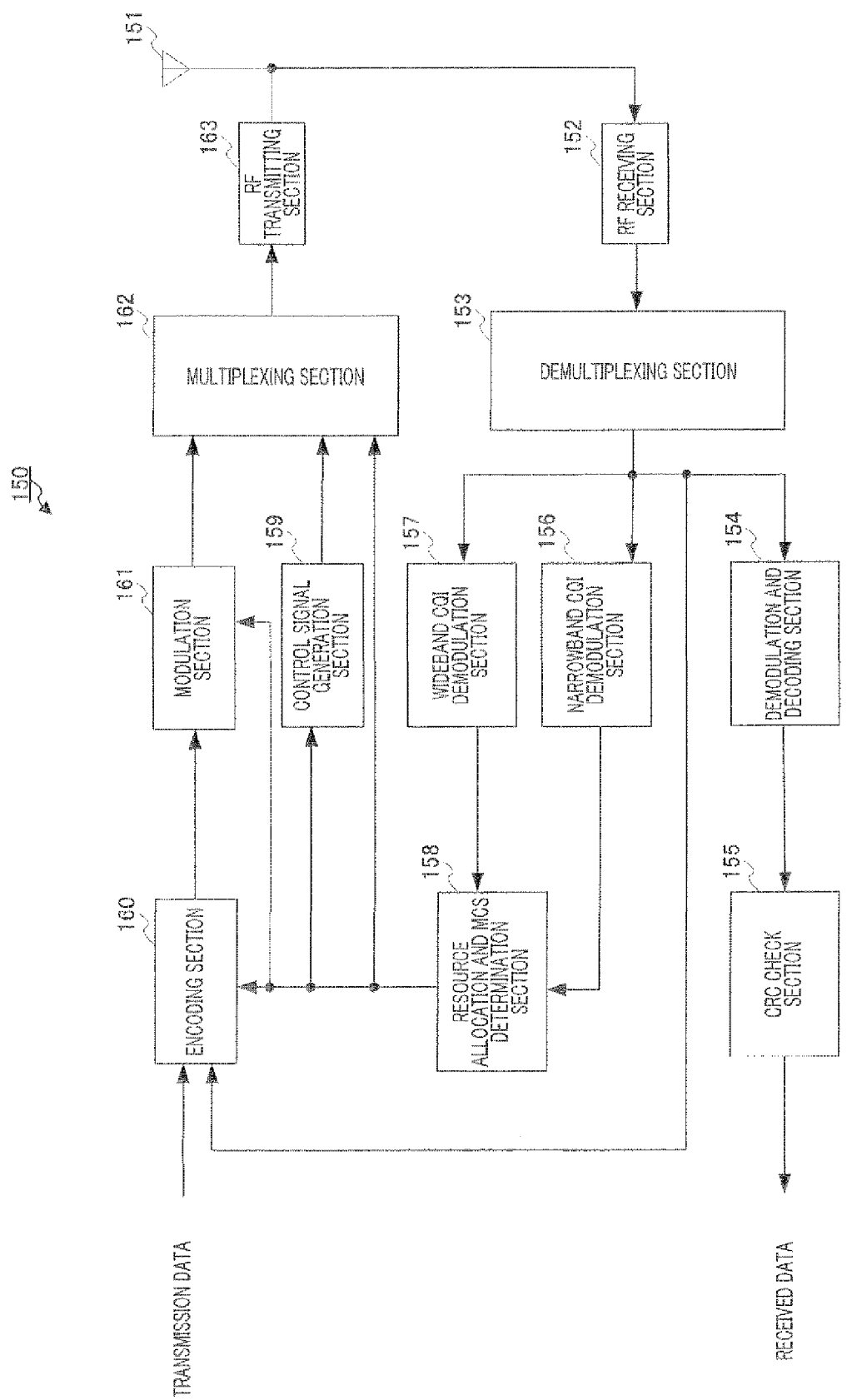
FIG. 6 is a block diagram showing a configuration of the transmitting apparatus according to Embodiment 1 of the present invention.

FIG. 6 is a block diagram showing the configuration of transmitting apparatus 150 according to Embodiment 1 of the present invention. A base station apparatus is a concrete example of transmitting apparatus 150 shown in FIG. 6, and transmitting apparatus 150 supports a plurality of system bandwidths.

In FIG. 6, RF receiving section 152 receives a signal transmitted from receiving apparatus 100 via antenna 151, performs radio receiving processing including down-conversion and A/D conversion on the received signal, and outputs the signal after radio receiving processing to demultiplexing section 153.

Demultiplexing section 153 demultiplexes the signal outputted from RF receiving section 152 into a wideband CQI index, a narrowband CQI index and an ACK or NACK and a data signal. Demultiplexing section 153 outputs the demultiplexed data signal to demodulation and decoding section 154, outputs the narrowband CQI index to narrowband CQI demodulation section 156, outputs the wideband CQI index to wideband CQI demodulation section 157 and outputs the ACK or NACK to encoding section 160.

Demodulation and decoding section 154 demodulates and decodes the data signal outputted from demultiplexing section 153, and outputs the decoded data to CRC check section 155.

CRC check section 155 performs a CRC check on the decoded data outputted from demodulation and decoding section 154, to detect whether or not there is an error, and outputs the is decoded data without error as received data.

Narrowband CQI demodulation section 156 demodulates the narrowband CQI index outputted from demultiplexing section 153. That is, narrowband CQI demodulation section 156 finds a TBS associated with the narrowband CQI index with reference to a CQI table and reads the TBS as information bits that can be transmitted with RBs to equal the number of RBs for CQI measurement. Narrowband CQI demodulation section 156 outputs this TBS as information used upon allocating resources in a narrow bandwidth, to resource allocation and MCS (Modulation and Coding Scheme) determination section 158.

Wideband CQI demodulation section 157 demodulates the wideband CQI index outputted from demultiplexing section 153. That is, wideband CQI demodulation section 157 finds a TBS associated with the wide band CQI index with reference to the CQI table and reads the TBS as information bits that can be transmitted with RBs to equal the number of RBs for CQI measurement. Wideband CQI demodulation section 157 outputs this TBS as information used upon allocating resources in overall system bandwidth, to resource allocation and MCS determination section 158.

Based on the TBSs outputted from narrowband CQI demodulation section 156 and wideband CQI demodulation section 157, resource allocation and MCS determination section 158 allocates resources formed with the RBs to equal the number of RBs for CQI measurement up to the number of RBs the overall system bandwidth, and outputs the resource allocation result to control signal generation section 159 and multiplexing section 162. Further, based on the TB Ss outputted from narrowband CQI demodulation section 156 and wideband CQI demodulation section 157, resource allocation and MCS determination section 158 determines a coding rate and a modulation scheme, and outputs the determined coding rate and the determined modulation scheme to encoding section 160 and modulation section 161, respectively.

Control signal generation section 159 generates a control signal using the system bandwidth, the narrow bandwidth start position, the resource allocation result the coding rate and the modulation scheme outputted from resource allocation and MCS determination section 158, and outputs the generated control signal to multiplexing section 162.

Encoding section 160 encodes transmission data using the coding rate outputted from resource allocation and MCS determination section 158, and outputs, to modulation section 161, new transmission data or retransmission data depending on the ACK or NACK outputted from demultiplexing section 153. That is, when the ACK is acquired, encoding section 160 outputs new transmission data to modulation section 161, and, when the NACK is acquired, encoding section 160 outputs retransmission data to modulation section 161.

Modulation section 161 modulates the transmission data outputted from encoding section 160 using the modulation scheme outputted from resource allocation and MCS determination section 158, and outputs the modulated transmission data to multiplexing section 162.

Multiplexing section 162 multiplexes the transmission data outputted from modulation section 161 and the control signal outputted from control signal generation section 159 based on the resource allocation result outputted from resource allocation and MCS determination section 158, and outputs the multiplexed signal to RF transmitting section 163.

RF transmitting section 163 performs radio transmitting processing including D/A conversion and up-conversion on the signal outputted from multiplexing section 162, and transmits the signal after radio transmitting processing to receiving apparatus 100 from antenna 151.

Next, the operations of the above receiving apparatus 100 and transmitting apparatus 150 will be explained using the sequence diagram shown in FIG. 7.

Figure 7:
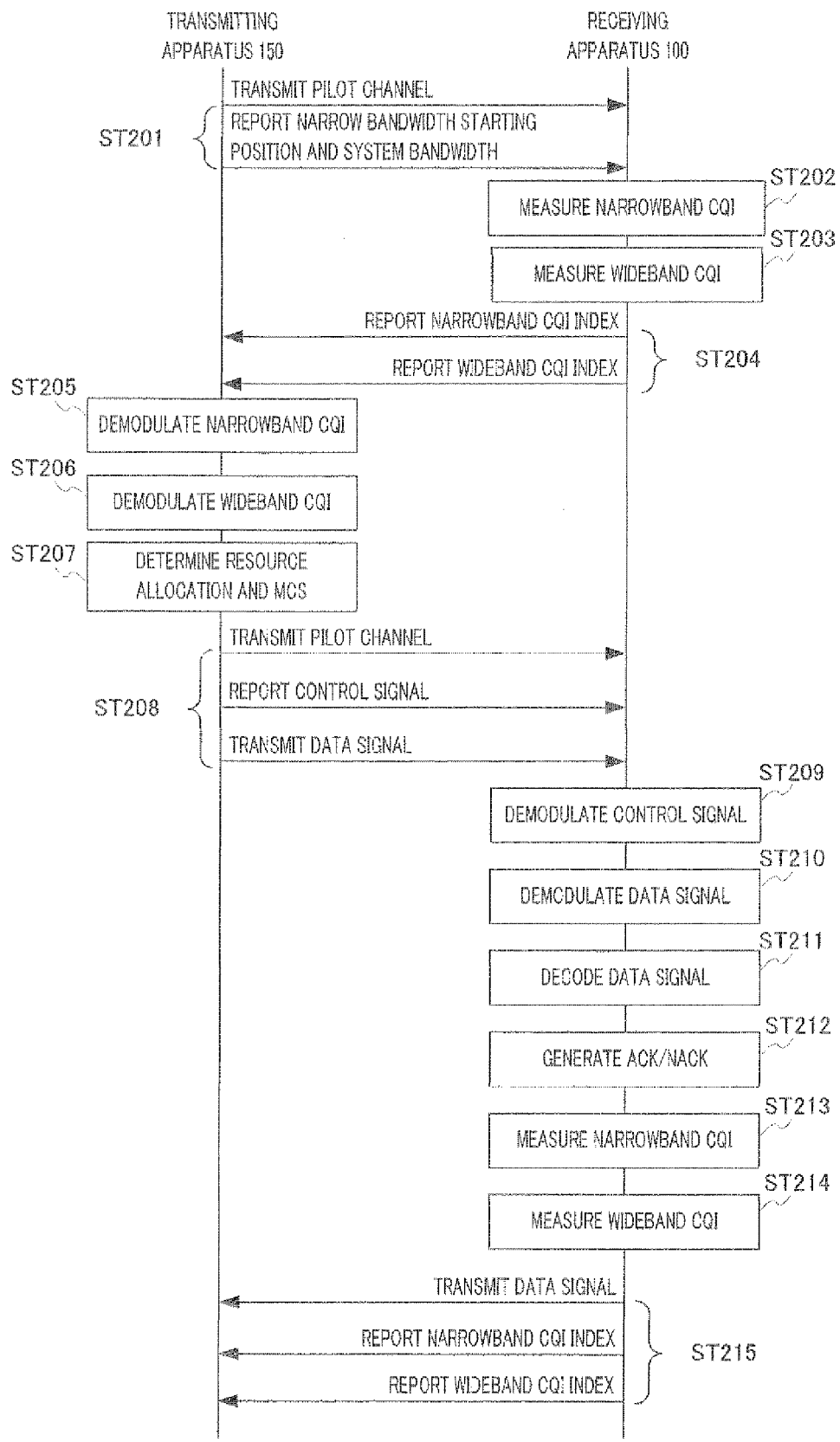
FIG. 7 is a sequence diagram showing the operations of the receiving apparatus and the transmitting apparatus according to Embodiment 1 of the present invention.

In FIG. 7, in step (hereinafter, simply "ST") 201, transmitting apparatus 150 transmits the pilot channel to receiving apparatus 100, and reports the narrow bandwidth start position and the wide bandwidth.

In ST 202, narrowband CQI measurement section 109 in receiving apparatus 100 measures the narrowband CQI, to acquire the narrowband CQI index.

In ST 203, wideband CQI measurement section 110 in receiving apparatus 100 measures the wideband CQI, to acquire the wideband CQI index.

In ST 204, receiving apparatus 100 reports the narrowband CQI index and the wideband CQI index to transmitting apparatus 150.

In ST 205, narrowband CQI demodulation section 156 in transmitting apparatus 150 demodulates the narrowband CQI index reported from receiving apparatus 100, to acquire the TBS associated with the narrowband CQI index.

In ST 206, wideband CQI demodulation section 157 in transmitting apparatus 150 demodulates the wideband CQI index reported from receiving apparatus 100, to acquire the TBS associated with the wideband CQI index.

In ST 207, based on the TBSs, resource allocation and MCS determination section 158 in transmitting apparatus 150 allocates resources and determines the coding rate and the modulation scheme.

In ST 208, transmitting apparatus 150 transmits the pilot channel to receiving apparatus 100, reports the narrow bandwidth start position, system bandwidth, resource allocation result, and coding rate and modulation scheme in a control signal, and transmits the data signal.

In ST 209, control signal demodulation section 104 in receiving apparatus 100 demodulates the control signal, and acquires the narrow bandwidth start position, system bandwidth, resource allocation result, and coding rate and modulation scheme.

In ST 210, data signal demodulation section 105 in receiving apparatus 100 demodulates the data signal.

In ST 211, decoding section 106 in receiving apparatus 100 decodes the data signal.

In ST 212, based on the CRC check result in CRC check section 107 in receiving apparatus 100, ACK/NACK generation section 108 in receiving apparatus 100 generates an ACK signal or NACK signal.

In ST 213, the same operation is carried out as the operation in ST 202. That is, narrowband CQI measurement section 109 in receiving apparatus 100 measures the narrowband CQI, to acquire the narrowband CQI index.

In ST 214, the same operation is carried out as the operation in ST 203. That is, wideband CQI measurement section 110 in receiving apparatus 100 measures the wideband CQI, to acquire the wideband CQI index.

In ST 215, receiving apparatus 100 transmits the data signal to transmitting apparatus 150, and reports the narrowband CQI index and the wideband CQI index.

In this way, according to Embodiment 1, a receiving apparatus extracts the predetermined number of RBs from the overall system bandwidth regardless of a system bandwidth as long as the system bandwidth is equal to or more than a predetermined value, measures an average CQI from the extract RBs and reports the average CQI to a transmitting apparatus, so that it is possible to reduce the amount of processing for CQI measurement in the receiving apparatus.

Although a case has been explained with the present embodiment as an example where, during CQI measurement processing in wideband CQI measurement section 110, the number of RBs that are used for calculating an average SINR and the number of RBs upon converting the number of resources assumed when a possible TRB is calculated, are the same value, the present invention is not limited to this, and an overall system bandwidth may be used for the former number of RBs and the same value as the number of RBs for CQI measurement may be used for the latter number of RBs.

Further, although a case has been explained with the present embodiment as an example where both the receiving apparatus and the transmitting apparatus hold the predetermined number of RBs for CQI measurement, the present invention is not limited to this, and, the transmitting apparatus may hold the number of RBs for CQI measurement, and may report the number of RBs for CQI measurement to the receiving apparatus.

Further, although a ease has been explained with the present embodiment as an example where the transmitting apparatus reports the narrow bandwidth start position to the receiving apparatus using the control signal, the present invention is not limited to this, and the transmitting apparatus and the receiving apparatus share the narrow bandwidth start position in advance. Further, the number of narrowband widths in which a CQI is measured may be multiple, and, in this case, feedback information may be generated using an arbitrary information compression method.

Further, although a case has been explained with the present embodiment where the narrowband CQI index and the wideband CQI index are reported at the same time from the receiving apparatus to the transmitting apparatus, the present invention is not limited to this, and the narrowband CQI index and the wideband CQI index may be reported at different times. For example, the wideband CQI index may be reported at longer cycles than the narrowband CQI index.

(Embodiment 2)

Figure 8:
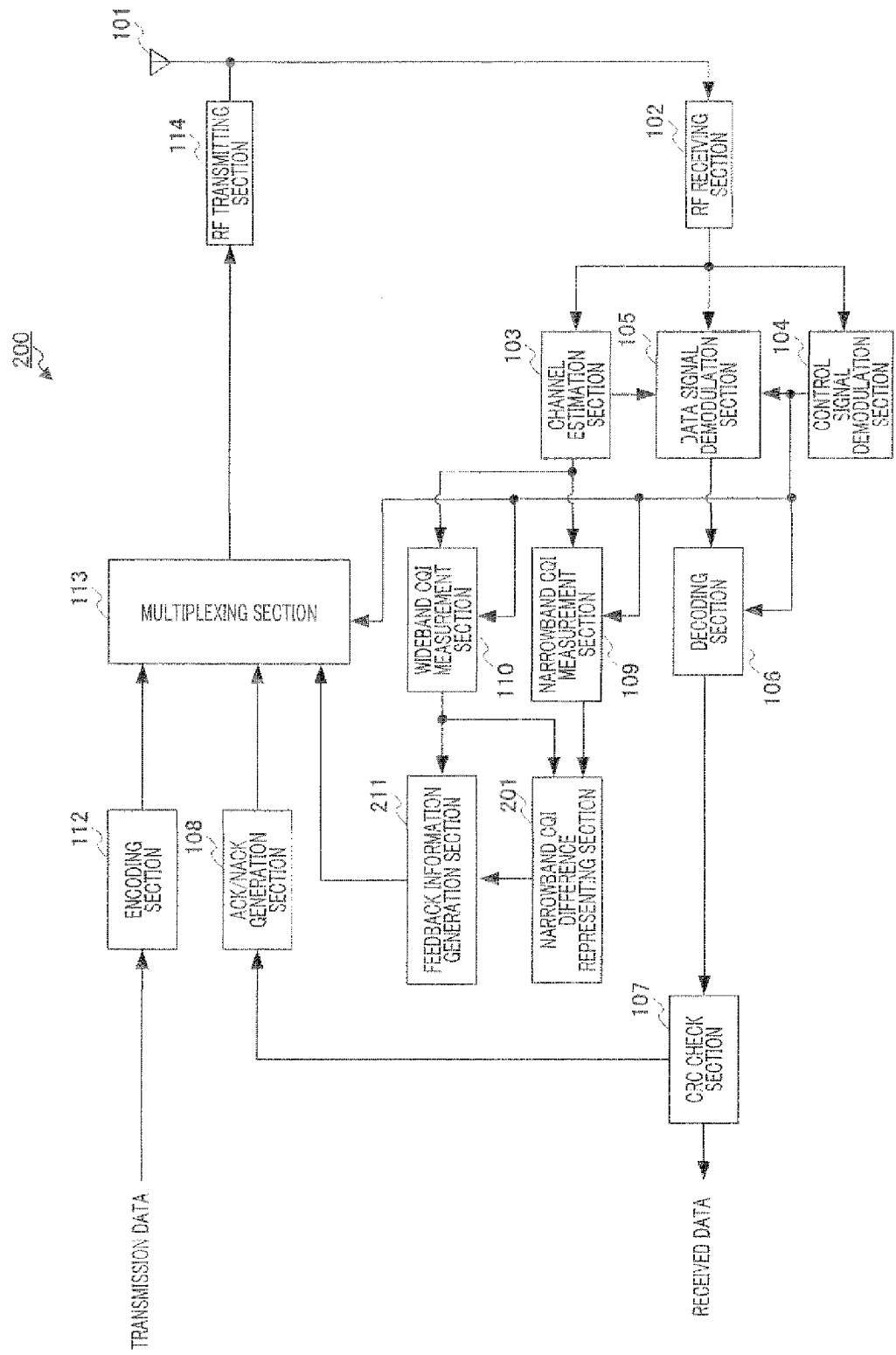
FIG. 8 is a block diagram showing a configuration of the receiving apparatus according to Embodiment 2 of the present invention.

FIG. 8 is a block diagram showing the configuration of receiving apparatus 200 according to Embodiment 2 of the present invention. FIG. 8 differs from FIG. 3 in adding narrowband CQI difference representing section 201 and changing feedback information generation section 111 to feedback information generation section 211.

In FIG. 8, narrowband CQI difference representing section 201 represents narrowband CQI index outputted from narrowband CQI measurement section 109 as a difference between the narrowband CQI index and wideband CQI index outputted from wideband CQI measurement section 110, and outputs this difference to feedback information generation section 211.

Feedback information generation section 211 generates feedback information including the wideband CQI index outputted from wideband CQI measurement section 110 and the narrowband CQI difference representation outputted from narrowband CQI difference representing section 201, and outputs the generated feedback information to multiplexing section 113.

Parallel to receiving apparatus 200, the transmitting apparatus (not shown) according to the present embodiment calculates a narrowband CQI index using the difference between the wideband CQI index and narrowband CQI index, and the wideband CQI index.

In this way, according to Embodiment 2, the receiving apparatus represents a narrowband CQI index and a wideband CQI index shown in the same CQI table as a difference and feeds back the difference to the transmitting apparatus, so that it is possible to reduce the amount of feedback information and improve the throughput of the communication system.

(Embodiment 3)

Figure 9:
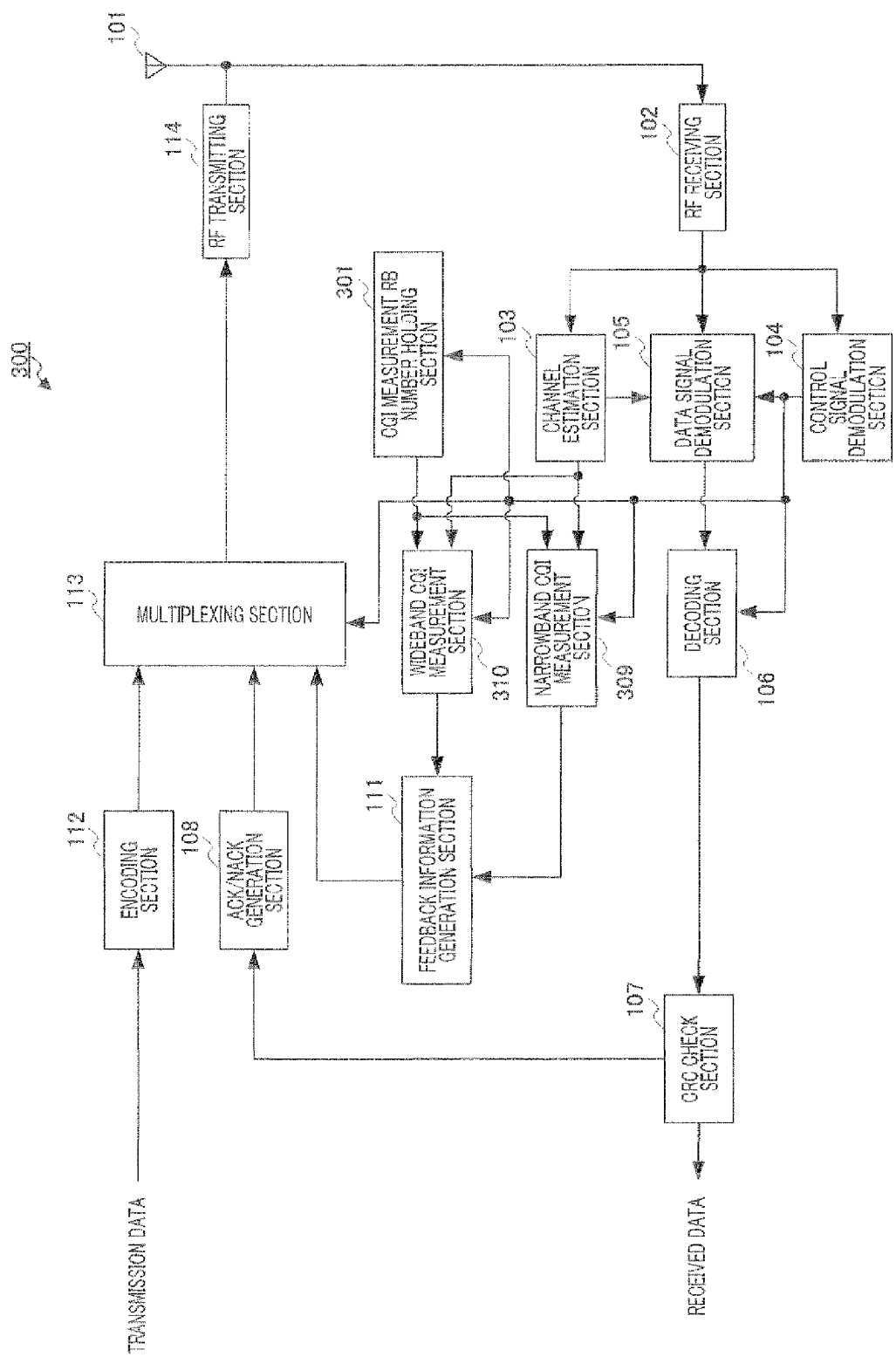
FIG. 9 is a block diagram showing a configuration of the receiving apparatus according to Embodiment 3 of the present invention.

FIG. 9 shows a block diagram showing the configuration of receiving apparatus 300 according to Embodiment 3 of the present invention. FIG. 9 differs from FIG. 3 in adding CQI measurement RB number holding section 301 and changing narrowband CQI measurement section 109 and wideband CQI measurement section 110 to narrowband CQI measurement section 309 and wideband CQI measurement section 310.

In FIG. 9, CQI measurement RB number holding section 301 holds a table in which system bandwidths are associated with the numbers of RBs for CQI measurement. CQI measurement RB number holding section 301 finds the number of RBs for CQI measurement associated with the system bandwidth outputted from control signal demodulation section 104 with reference to the table, and outputs the number of RBs for CQI measurement to narrowband CQI measurement section 309 and wideband CQI measurement section 310. In the table held in CQI measurement RB number holding section 301, the system bandwidths are integral multiples of the number of RBs for CQI measurement. Further, in the table held in CQI measurement RB number holding section 301, a greater system bandwidth is associated with a greater number of RBs for CQI measurement. For example, the number of RBs for CQI measurement associated with the system bandwidth of 5 MHz or less is 5 RBs and the number of RBs for CQI measurement associated with the system bandwidth of 10 MHz or more is 10 RBs.

Narrowband CQI measurement section 309 and wideband CQI measurement section 310 differ from narrowband CQI measurement section 109 and wideband CQI measurement section 110 in FIG. 3 in Only performing CQI measurement processing using the number of RBs for CQI measurement outputted from CQI measurement RB number holding section 301, instead of a predetermined number of RBs for CQI measurement.

In this way, according to the present embodiment, the receiving apparatus measures a CQI using the number of RBs for CQI measurement associated with a greater system bandwidth when the number of RBs for CQI measurement is greater, so that it is possible to reduce the amount of feedback and improve the accuracy of CQI measurement.

In the table held in CQI measurement RB number holding section 301, the system bandwidths may be grouped into several groups, for example, depending on values of the bandwidths, and the numbers of RBs for CQI measurement may be individually associated with the groups.

(Embodiment 4)

In Embodiment 4 of the present invention, an explanation will be given to the CQI measurement processing performed in a case where a system bandwidth is smaller than a bandwidth to equal the number of RBs for CQI measurement, for example, when the system bandwidth is 3 RBs. When the system bandwidth is smaller than the bandwidth to equal the number of RBs for CQI measurement, information bits that can be transmitted while satisfying a predetermined packet error rate, that is, the TBS, depend on a SINR.

Figure 10:
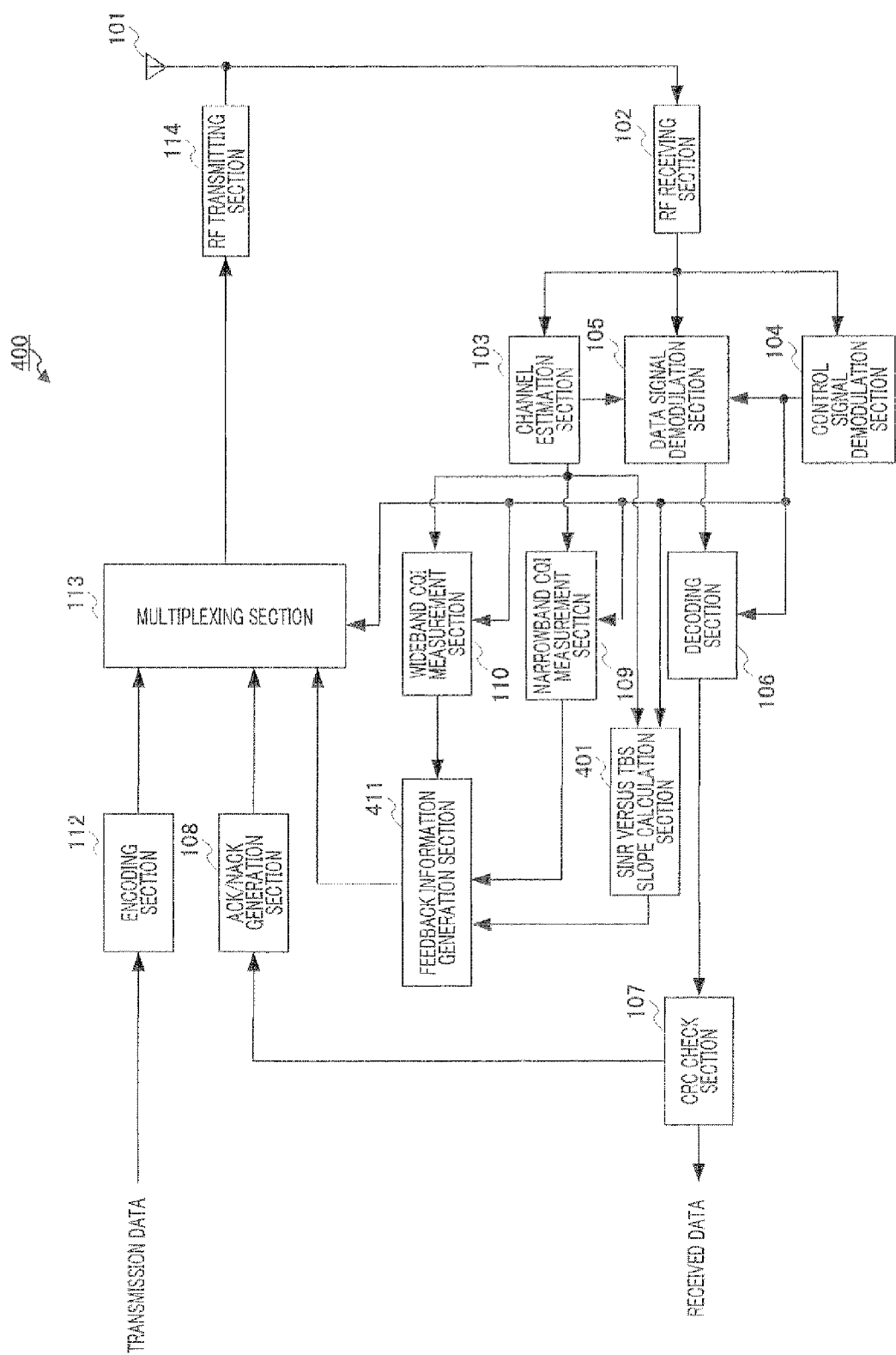
FIG. 10 is a block diagram showing a configuration of the receiving apparatus according to Embodiment 4 of the present invention.

FIG. 10 is a block diagram showing the configuration of receiving apparatus 400 according to Embodiment 4 of the present invention. FIG. 10 differs from FIG. 3 in adding SINR versus TBS slope calculation section 401 and changing feedback information generation section 111 to feedback information generation section 411.

In FIG. 10, when a system bandwidth outputted from control signal demodulation section 104 is smaller than a bandwidth to equal the number of RBs for CQI measurement, SINR versus TBS slope calculation section 401 calculates a SINR vs TBS slope based on a channel estimation value received as input from channel estimation section 103, and outputs the calculated SINR vs TBS slope to feedback information generation section 411. For example, SINR versus TBS slope calculation section 401 calculates the ratio between the TBS in the bandwidth to equal the number of RBs for CQI measurement and the TBS in the system bandwidth or the difference between the TBS in the bandwidth to equal the number of RBs for CQI measurement and the TBS in the system bandwidth as the SINR vs TBS slope.

Feedback information generation section 411 generates feedback information including the SINR vs TBS slope outputted from SINR versus TBS slope calculation section 401 and the narrowband CQI index outputted from narrowband CQI measurement section 109, and outputs the generated feedback information to multiplexing section 113. Or feedback information generation section 411 generates feedback information including the narrowband CQI index outputted from narrowband CQI measurement section 109 and the wideband CQI index outputted from wideband CQI measurement section 110, and outputs the generated feedback information to multiplexing section 113.

Figure 11:
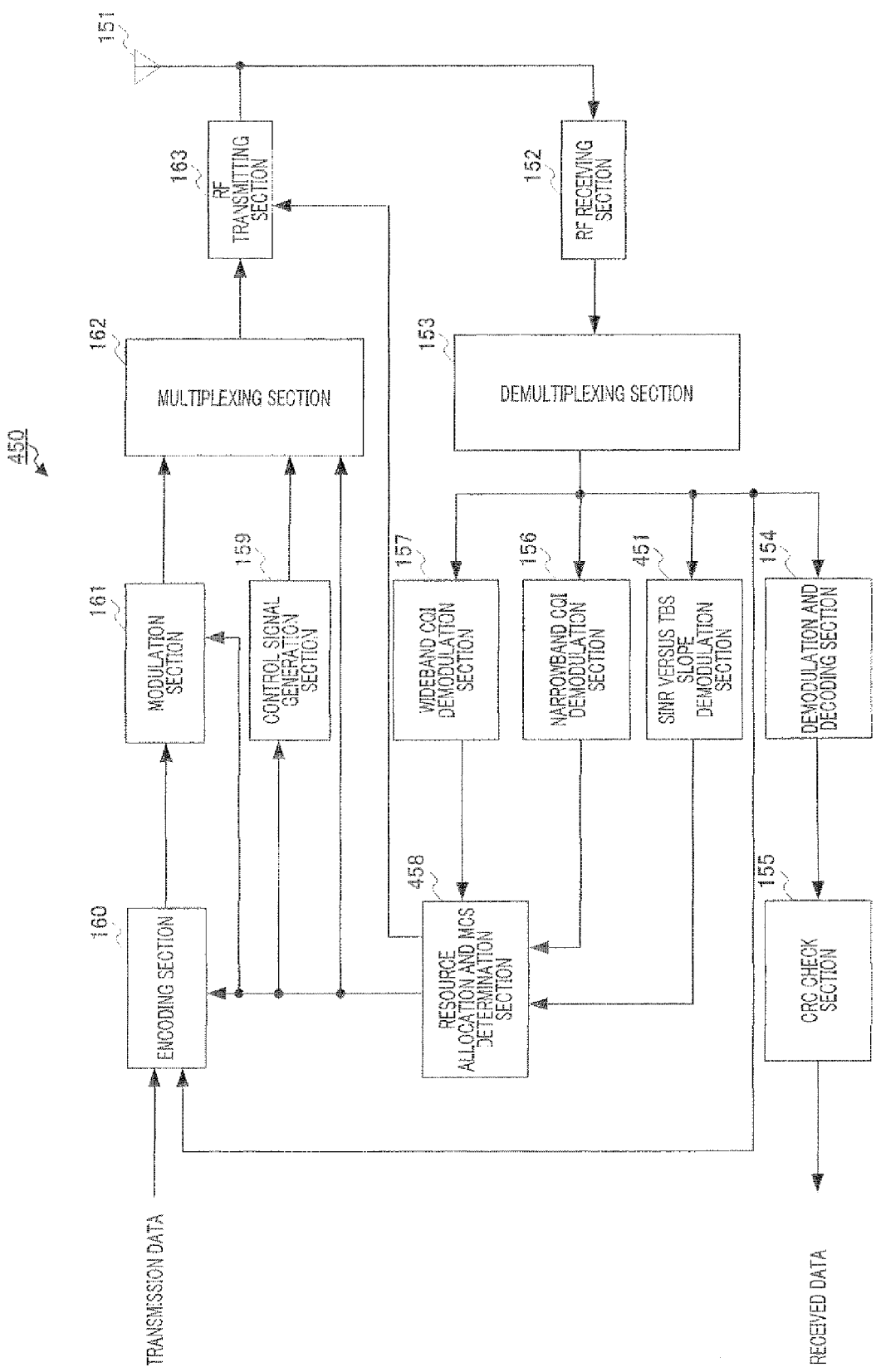
FIG. 11 is a block diagram showing a configuration of the transmitting apparatus according to Embodiment 4 of the present invention.

FIG. 11 is a block diagram showing the configuration of transmitting apparatus 450 according to Embodiment 4 of the present invention. FIG. 11 differs from FIG. 6 in adding SINR versus TBS slope demodulation section 451 and changing resource allocation and MCS determination section 158 to resource allocation and MCS determination section 458.

SINR versus TBS slope demodulation section 451 demodulates the SINR vs TBS slope outputted from demultiplexing section 153 and outputs the demodulated SINR vs TBS slope to resource allocation and MCS determination section 458.

Based on the SINR vs TBS slope outputted from SINR versus TBS slope demodulation section 451, resource allocation and MCS determination section 458 estimates an increase in SINR requirement when the number of allocated RBs is small and does not satisfy the defined TBS, and commands RF transmitting section 163 to increase transmission power as necessary. Although, when the SINR requirement increases, transmission power is increased here, it is equally possible to reduce the number of bits when the SINR requirement increases, thereby increasing the coding gain.

In this way, according to Embodiment 4, it is possible to increase flexibility to reduce the number of RBs upon allocating resources and secure the accuracy of link adaptation.

Embodiments of the present invention have been described above.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable process or where connections and settings of circuit cells within an LSI can be reconfigured is also possible.

Further, if integrated circuit technology comes out to replace LSIs as a result of the advancement of semiconductor technology or a derivative other technology, it is naturally also possible to carry out function block integration using this technology. Application of biotechnology is also possible.

The disclosure of Japanese Patent Application. No. 2007-257779, filed on Oct. 1, 2007, including the specification, drawings and abstract, is incorporated herein by reference in its entirety.

INDUSTRIAL APPLICABILITY

The receiving apparatus and the communication method according to the present invention is applicable to communication systems providing a plurality of system bandwidths, for example, mobile communication systems.

The invention claimed is:

1. A transmitting apparatus transmitting data to a receiving apparatus in a communication system where a plurality of system bandwidths are set, said transmitting apparatus comprising:
    a transmitting unit configured to transmit a pilot signal to the receiving apparatus; and
    a receiving unit configured to receive feedback information which is comprised of a subband CQI for a subband which is a set of a predefined number of contiguous resource blocks depending on the system bandwidth, each of the resource blocks being comprised of a plurality of consecutive subcarriers in a frequency domain, and a wideband CQI for an entire system bandwidth, the subband CQI and the wideband CQI being calculated based on the pilot signal using a relationship of a CQI which represents a channel quality and which corresponds to a transport block size of the data in the receiving apparatus;
    wherein a plurality of the subband CQIs for a plurality of the subbands and the wideband CQI are calculated using the same relationship in the receiving apparatus, and said receiving unit receives the feedback information which is comprised of the plurality of the subband CQIs and the wideband CQI,
    wherein the larger the system bandwidth is, the larger the predefined number of contiguous resource blocks forming the subband is, and
    wherein said transmitting unit transmits information related to the system bandwidth, and the subband CQI is calculated, based on the information, for the subband which is comprised of the predefined number of the resource blocks, the predefined number being associated with the system bandwidth.

2. The transmitting apparatus according to claim 1, wherein the subband CQI and the wideband CQI are calculated using the same relationship regardless of the system bandwidths.

3. The transmitting apparatus according to claim 1, wherein a total number of resource blocks corresponding to the system bandwidth is an integer multiple of the predefined number.

4. The transmitting apparatus according to claim 1, wherein said transmitting apparatus has a position of the subband in common with the receiving apparatus.

5. The transmitting apparatus according to claim 1, wherein the subband CQI is calculated as a difference with respect to the wideband CQI.

6. The transmitting apparatus according to claim 1, wherein the plurality of contiguous resource blocks are divided into groups depending on the system bandwidth, and a predefined number of the resource blocks forming the subband is associated with each of the groups.

7. A data communication method in a communication system where a plurality of system bandwidths are set, said method comprising:

transmitting a pilot signal to a receiving apparatus; and receiving feedback information which is comprising a subband CQI for a subband which is a set of a predefined number of contiguous resource blocks depending on the system bandwidth, each of the resource block being comprised of a plurality of consecutive subcarriers in a frequency domain, and a wideband CQI for an entire system bandwidth, the subband CQI and the wideband CQI being calculated based on the pilot signal using a relationship of a CQI which represents a channel quality and which corresponds to a transport block size of the data in the receiving apparatus;

wherein a plurality of the subband CQIs for a plurality of the subbands and the wideband CQI are calculated using the same relationship in the receiving apparatus, and the feedback information which is comprised of the plurality of the subband CQIs and the wideband CQI is received, wherein the larger the system bandwidth is, the larger the predefined number of contiguous resource blocks forming the subband is, and wherein information related to the system bandwidth is transmitted, and the subband CQI is calculated, based on the information, for the subband which is comprised of the predefined number of the resource blocks, the predefined number being associated with the system bandwidth.

8. The data communication method according to claim 7, wherein the subband CQI and the wideband CQI are calculated using the same relationship regardless of the system bandwidths.

9. The data communication method according to claim 7, wherein a total number of resource blocks corresponding to the system bandwidth is an integer multiple of the predefined number.

10. The data communication method according to claim 7, wherein a position of the subband is in common with the receiving apparatus.

11. The data communication method according to claim 7, wherein the subband CQI is calculated as a difference with respect to the wideband CQI.

12. The data communication method according to claim 7, wherein the plurality of contiguous resource blocks are divided into groups depending on the system bandwidth, and a predefined number of the resource blocks forming the subband is associated with each of the groups.

* * * * *